United States Patent
Bailey

(10) Patent No.: US 9,851,587 B2
(45) Date of Patent: Dec. 26, 2017

(54) EYEGLASS ACCESSORY

(71) Applicant: Melanie Deronica Bailey, Atlanta, GA (US)

(72) Inventor: Melanie Deronica Bailey, Atlanta, GA (US)

( * ) Notice: Subject to any disclaimer, the term of this patent is extended or adjusted under 35 U.S.C. 154(b) by 0 days.

(21) Appl. No.: 15/233,419

(22) Filed: Aug. 10, 2016

(65) Prior Publication Data

US 2017/0045758 A1    Feb. 16, 2017

Related U.S. Application Data

(60) Provisional application No. 62/282,711, filed on Aug. 10, 2015.

(51) Int. Cl.
| | |
|---|---|
| G02C 9/00 | (2006.01) |
| G02C 5/00 | (2006.01) |
| G02C 7/10 | (2006.01) |
| G02C 1/00 | (2006.01) |

(52) U.S. Cl.
CPC ............ *G02C 9/00* (2013.01); *G02C 1/10* (2013.01); *G02C 5/008* (2013.01); *G02C 7/10* (2013.01)

(58) Field of Classification Search
CPC ............ G02C 9/00; G02C 9/04; G02C 7/086
USPC ........................................ 351/47, 48, 57, 58
See application file for complete search history.

(56) References Cited

U.S. PATENT DOCUMENTS

| | | |
|---|---|---|
| 2,901,752 A | 9/1959 | Granger |
| 3,890,037 A | 6/1975 | Zingarelli |
| 5,080,475 A * | 1/1992 | Ferron ............ G02C 9/04 351/47 |
| 6,244,705 B1 | 6/2001 | Ledbetter et al. |
| 7,296,888 B2 | 11/2007 | McKenna et al. |

FOREIGN PATENT DOCUMENTS

WO    WO 02/086598    10/2002

* cited by examiner

*Primary Examiner* — Hung Dang
(74) *Attorney, Agent, or Firm* — Ballard Spahr LLP

(57) ABSTRACT

Disclosed herein is an eyeglass accessory that is configured to retain one or more eyeglass lenses and is also configured to receive a front portion of eyeglasses.

18 Claims, 9 Drawing Sheets

EYEGLASS ACCESSORY

CROSS REFERENCE TO RELATED APPLICATIONS

This application is a U.S. Non-Provisional application, which claims the benefit of U.S. Provisional Application No. 62/282,711, filed on Aug. 10, 2015, which is hereby incorporated by reference in its entirety.

BACKGROUND

The sun's ultraviolet (UV) rays and blue light rays can cause damage to your eyes. The harmful effects of these rays are three times greater in the summer than in the winter, and a person runs a high risk of sustaining serious eye damage if they do not wear eye protection.

Approximately 30% or more of the world's population wears prescription eyeglasses to correct their eyesight. An individual who wears prescription lenses may have to rely on solutions such as prescription sunglasses, clip-on, snap to, buckle sunglasses, transition lenses, or wraparound sun shields attached to the prescription glasses to protect his/her eyes from the sun's harmful ultraviolet rays. Carrying both normal prescription eyeglasses and prescription sunglasses can be both inconvenient and expensive. Using clip-on, snap to, buckle sunglasses, or a wraparound sun shield may look unnatural and unfashionable.

Transitional eyeglasses are convenient, but if a person wears glasses or contacts they need to have their eyes checked yearly. Eyesight can change over time and this change can require that a person needs to purchase a new pair of prescribed transitional glasses, which can be expensive.

Also, it is desired to protect eyeglasses, such as prescription eyeglasses, from becoming contaminated or scratched. For example, it is desired for a doctor to protect his/her eyeglasses from being contaminated by bodily fluids from a patient during surgery. In another example, it is desired for person doing construction, wood work, or other task where there is a risk of objects scratching eyeglasses to protect his/her eyeglasses from being scratched.

The disclosure herein, in one aspect, relates to an eyeglass accessory that is configured to receive eyeglasses such that the eyeglass accessory can provide for shaded lenses or protection of the eyeglasses from the sun, contamination, and/or scratches.

SUMMARY

Disclosed herein is an eyeglass accessory comprising: a) one or more eyeglass lenses; and b) a flexible eyeglass housing comprising an outer frame comprising one or more continuous grooves retaining the one or more eyeglass lenses, wherein the flexible eyeglass housing further comprises an inner frame of a flexible material that comprises a continuous groove configured to receive a front portion of eyeglasses.

Also disclosed herein is an eyeglass accessory comprising: a) one or more eyeglass lenses; and b) a flexible eyeglass housing comprising an outer surface retaining the one or more eyeglass lenses, wherein the flexible eyeglass housing further comprises an inner frame of a flexible material that comprises a continuous groove configured to receive a front portion of eyeglasses.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the present invention without limiting the breadth, scope, scale, or applicability of the present invention. The drawings are not to scale.

DETAILED DESCRIPTION

Figure 1A:
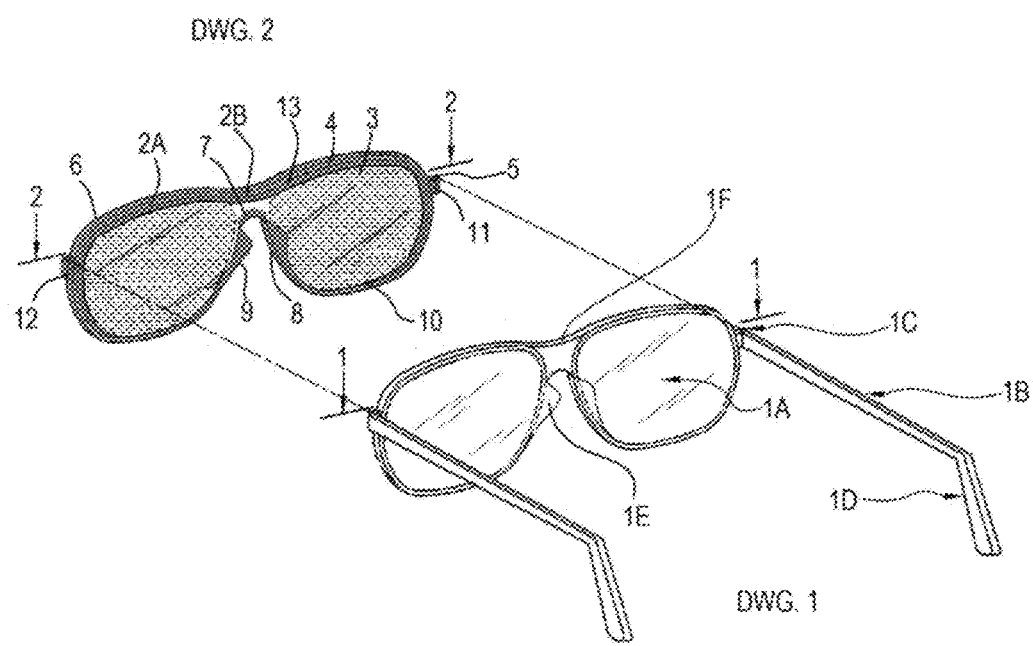
FIGS. 1A-1G show an example of the eyeglass accessory and components related to the eyeglass accessory disclosed herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

It is also to be understood that the terminology used herein is for the purpose of describing particular aspects only and is not intended to be limiting. Although any devices and methods similar or equivalent to those described herein can be used in the practice or testing of the present invention, example methods and materials are now described.

As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a subject" includes two or more subjects.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The disclosure herein provides for an eyeglass accessory that can conveniently be attached and detached to eyeglasses. The disclosure herein provides mechanisms to provide a convenient and an easily attachable/detachable temporary eyeglass accessory to prescription lenses or optical lenses, overlaying eyeglasses, such as sunglasses, over the prescription optical lenses glasses. The eyeglass accessory can be configured to fit any shape eyeglasses.

Accordingly, disclosed herein is an eyeglass accessory comprising: a) one or more eyeglass lenses; and b) a flexible eyeglass housing comprising an outer frame comprising one or more continuous grooves retaining the one or more eyeglass lenses, wherein the flexible eyeglass housing further comprises an inner frame of a flexible material that comprises a continuous groove configured to receive a front portion of eyeglasses.

Also disclosed herein is an eyeglass accessory comprising: a) one or more eyeglass lenses; and b) a flexible eyeglass housing comprising an outer surface retaining the one or more eyeglass lenses, wherein the flexible eyeglass housing further comprises an inner frame of a flexible material that comprises a continuous groove configured to receive a front portion of eyeglasses.

With reference to FIG. 1A, the eyeglass accessory includes one or more eyeglass lenses 3 and a flexible eyeglass housing 2 comprising an outer frame 2A comprising one or more continuous grooves and inner frame of a flexible material 2B that comprises a continuous groove configured to receive a front portion of eyeglasses 1. In FIG. 1A: 1—eyeglasses; 1A—lens; 1B—temple; 1C—butt strap (butt strap connects to temple); 1D—ear piece; 1E—pad plate; 1F—bridge; 2—flexible eyeglass housing; 2A—outer frame; 2B—inner frame of flexible material; 3—lens; 4 bar and top bridge; 5—front endpiece; 6—top rim; 7—back of bridge; 8—side rim; 9—nose pad; 10—back bottom rim; 11—back endpiece; 12—inside of endpiece (receives butt strap 1C); 13—top back rim. The enumerations in FIG. 1A correspond to the enumeration in all Figures presented herein.

Figure 1B:
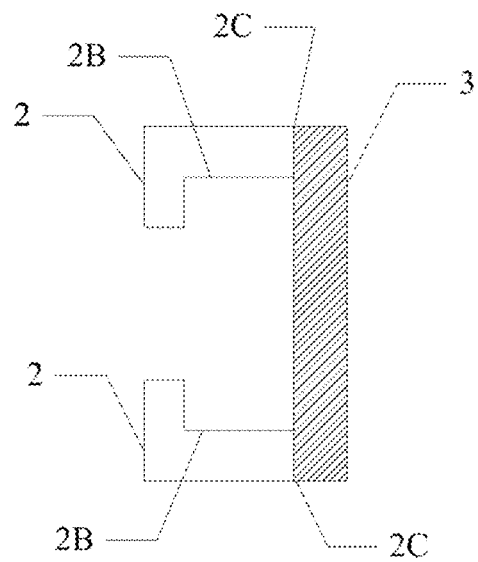
Figure 1C:
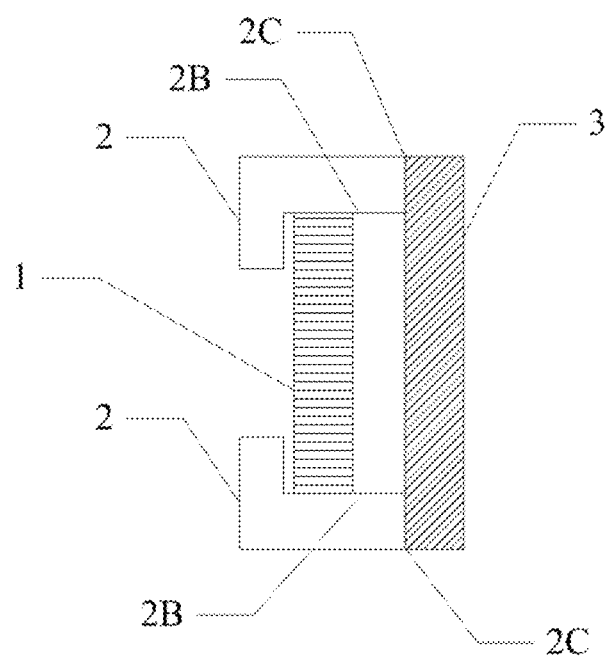

Alternatively, with reference to FIGS. 1B and 1C, the eyeglass accessory includes one or more eyeglass lenses 3 and a flexible eyeglass housing 2 comprising an outer surface 2C and an inner frame of a flexible material 2B that comprises a continuous groove configured to receive a front portion of eyeglasses 1. FIGS. 1B and 1C are cross section of the eyeglass accessory, wherein the outer surface 2C of the flexible eyeglass housing 2 retains the one or more eyeglass lenses 3 via an adhesive. As such, the adhesive can contact both the outer surface 2C of the eyeglass accessory and the one or more eyeglass lenses 3. The width of the continuous groove of the inner frame of a flexible material 2B can be configured to receive any width of a frame or lens of the eyeglasses 1.

Furthermore, in FIGS. 1B and 1C, the flexible eyeglass housing 2 with the inner frame of flexible material 2B has a continuous groove that is configured to receive a front portion of eyeglasses 1, and an outer surface 2C for retaining the one or more eyeglass lenses 3 to the eyeglass accessory 2.

Figure 1D:
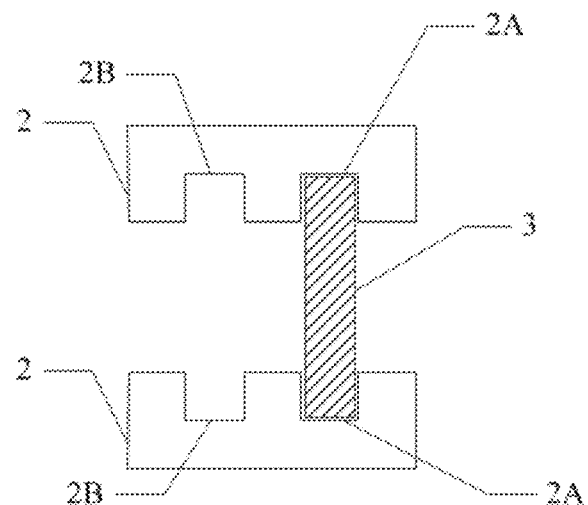
Figure 1E:
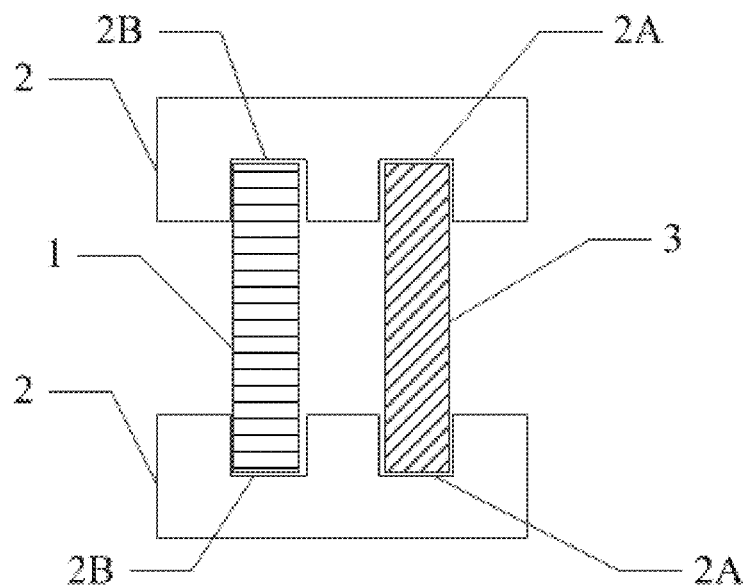

FIGS. 1D and 1E show cross sections of a configuration of the eyeglass accessory, wherein the eyeglass accessory has a continuous groove in the inner frame of the flexible material 2B that is configured to receive a front portion of eyeglasses 1, and an outer frame 2A with one or more continuous grooves that is configured to retain the one or more eyeglass lenses 3 to the eyeglass frame. As shown in FIGS. 1D and 1E there can be a material separating and defining a portion of the inner frame of the flexible material 2B and the outer frame 2A with one or more continuous grooves. The width of the continuous groove of the inner frame of a flexible material 2B can be configured to receive any width of a frame or lens of the eyeglasses 1. The width of the one or more continuous grooves of the outer frame 2A can be configured to receive any width of the one or more eyeglass lenses 3.

Figure 1F:
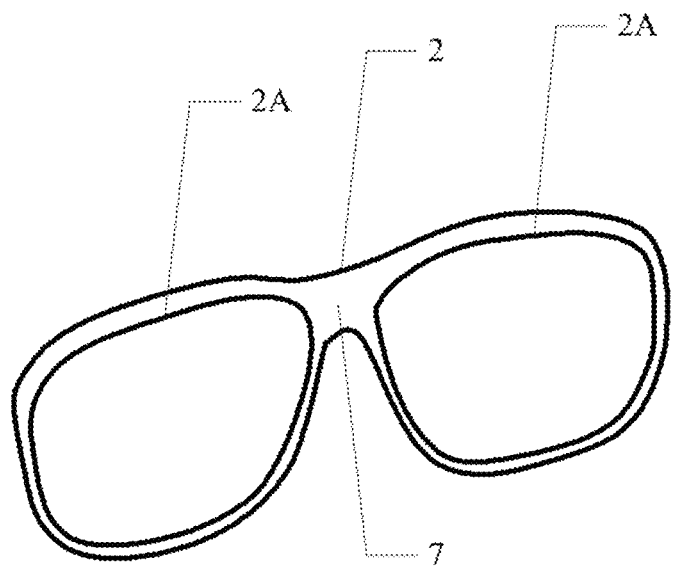

With reference to FIG. 1F, the outer frame can comprise one continuous groove that can be configured to retain the one or more eyeglass lenses to the eyeglass frame. For example, the outer frame can comprise one continuous groove configured to retain one eyeglass lens to the eyeglass frame. In another example, the outer frame can comprise one continuous groove configured to retain two eyeglass lenses to the eyeglass frame.

Figure 1G:
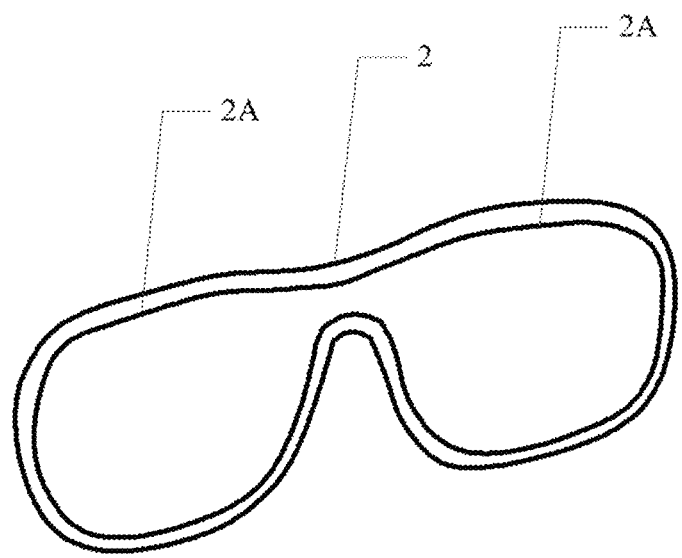

With reference to FIG. 1G, the outer frame can comprise two continuous grooves 2A that are configured to retain two eyeglass lenses to the eyeglass frame. The two continuous grooves of the outer frame can substantially be oriented in the same plane relative to each other. As such, two eyeglass lenses will be oriented in the same plane relative to each other when inserted into the two continuous grooves 2A. The two continuous grooves of the outer frame can be separated from each other by a material of the bridge 7.

In one aspect, the outer frame of the flexible eyeglass housing can be configured to retain replaceable eyeglass lenses. The outer frame of the flexible eyeglass housing can be configured to retain different shapes and sizes of eyeglass lenses.

In one aspect, the outer surface of the flexible eyeglass housing can be configured to retain different shapes and sizes of eyeglass lenses.

In another aspect, the inner frame of the flexible material of the flexible eyeglass housing can be configured to receive a front portion of special purpose glasses, such as but without limitation, the front portion of reading glasses, sunglasses, prescription glasses, and transitional glasses for sun-shield and or styles and the like. The one or more eyeglass lenses can be of a transparent optical material suitably shaped to cover the eyeglasses.

The outer frame comprises one or more continuous grooves configured to retain the one or more eyeglass lenses. In such an aspect, the one or more eyeglass lenses can conveniently be replaced with identically shaped and sized or differently shaped and sized eyeglass lenses. As such, one eyeglass accessory can be used to retain multiple styles of eyeglass lenses, which allows a user to conveniently use only one eyeglass accessory regardless of the desired style of eyeglass lenses.

In another aspect, the outer surface retains the one or more eyeglass lenses via an adhesive. The adhesive can be any suitable adhesive known in the art. In such an aspect, the outer surface retains the one or more eyeglass lenses via an adhesive, and the inner frame of the flexible material is configured to receive a front portion of eyeglasses.

The one or more eyeglass lenses can be made of any suitable material. Suitable materials for the one or more eyeglass lenses include, but are not limited to, glass, such as, for example, crown glass; plastic, such as, for example, high-index plastic, mid-index plastic, and CR-39 plastic; polycarbonate; tribrid; spectralite; and trivex.

The one or more eyeglass lenses can be an eyeglass lens suitable for particular uses, such as, for example, providing protection from the sun, providing means for viewing 3D movies, providing protection from contamination of eyeglasses, or providing protection from scratching eyeglasses.

In one aspect, the one or more eyeglass lenses can be shaded. As such, the shaded one or more eyeglass lenses can effectively provide for protection from the sun or other light sources. In another aspect, the one or more eyeglass lenses can be one or more polarized eyeglass lenses. Shaded and polarized eyeglass lenses are known in the art.

In another aspect, the one or more eyeglass lenses can be one or more 3D eyeglass lenses. The eyeglass accessory with a 3D eyeglass lens can be used to watch a 3D show in movie theaters or on TV.

In another aspect, the one or more eyeglass lenses can be clear. The eyeglass accessory with one or more clear eyeglasses lens can be used to protect eyeglasses from becoming contaminated or scratched. For example, a doctor using eyeglasses can use the eyeglass accessory to protect his/her eyeglasses from being contaminated by bodily fluids from a patient during surgery. Furthermore, for such use, it can be desired that the eyeglass accessory is sterile to minimize the risk of infection of a patient. A sterile eyeglass accessory can be a single use sterile eyeglass accessory that can be disposed of after use. In such an aspect, the one or more eyeglass lenses can be larger in size than the eyeglasses, thereby also protecting an area around the eyeglasses from becoming contaminated.

In another example, the eyeglass accessory can be used as safety glasses to protect the eyeglasses from becoming scratched. For example, the eyeglass accessory can be used by a construction worker or carpenter as safety glasses.

In one aspect, the one or more eyeglass lenses can be one eyeglass lens. The one eyeglass lens can be configured to at least have the same size and shape as the front portion of the eyeglasses.

In another aspect, the one or more eyeglass lenses can be two eyeglass lenses. The two eyeglass lenses can be separated from each other. Each of the two eyeglass lenses can have the same shape and size as each lens of the eyeglasses.

The one or more eyeglass lens can be of any shape and size. Suitable shapes of the one or more eyeglass lenses includes, but are not limited to, circular, oval, rectangular, heart, diamond, cat eyes, aviator, butterfly, or wayfarer. In one aspect, the shape of the one or more eyeglass lenses can be substantially identical to the shape of a lens and/or frame of the eyeglasses that the inner frame of a flexible material is configured to receive. In another aspect, the size of the eyeglass lens can be substantially identical to the size of a lens and/or frame of the eyeglasses that the inner frame of a flexible material is configured to receive. In yet another aspect, the shape and size of the eyeglass lens can be substantially identical to the shape and size of a lens and/or frame of the eyeglasses that the inner frame of a flexible material is configured to receive. In yet another aspect, the size of the eyeglass lens can be larger than the size of a lens and/or frame of the eyeglasses that the inner frame of a flexible material is configured to receive. For example, if the eyeglass accessory is to protect the eyeglasses from becoming contaminated or scratched it can be suitable that the eyeglass lens is larger than the size of a lens and/or frame of the eyeglasses that the inner frame of a flexible material is configured to receive. In such configuration the eyeglass accessory can also provide protection of an area surrounding the eyeglasses. For example, the one or more eyeglass lenses can be at least 5 cm$^2$, 10 cm$^2$, 15 cm$^2$, 20 cm$^2$, or 30 cm$^2$ larger than the size of a lens and/or frame of the eyeglasses that the inner frame of a flexible material is configured to receive.

In one aspect, an outer edge of the one or more eyeglass lenses can extend at least 2 cm from an outer edge of the inner frame of the flexible material. In another aspect, an outer edge of the one or more eyeglass lenses can extend at least 5 cm from an outer edge of the inner frame of the flexible material. In yet another aspect, an outer edge of the one or more eyeglass lenses can extend at least 10 cm from an outer edge of the inner frame of the flexible material. In yet another aspect, an outer edge of the one or more eyeglass lenses can extend at least 20 cm from an outer edge of the inner frame of the flexible material. For example, an outer edge of the one or more eyeglass lenses extend from 2 cm to 20 cm, 5 cm to 20 cm, or 10 cm to 20 cm, from an outer edge of the inner frame of the flexible material.

In one aspect, the inner frame of the flexible material can have a substantial identical shape as the one or more eyeglass lenses. For example, the shape of the one or more eyeglass lenses can be circular, oval, rectangular, heart, diamond, cat eye, aviator, butterfly, or wayfarer, and the inner frame of the flexible material can have a substantial identical shape as the one or more eyeglass lenses. In another aspect, the inner frame of the flexible material has shape that can be different than the one or more eyeglass lenses. For example, the shape of the one or more eyeglass lenses can be circular, oval, rectangular, heart, diamond, cat eyes, aviator, butterfly, or wayfarer, and the inner frame of the flexible material can have a shape that is different than the one or more eyeglass lenses.

In one aspect, the inner frame of the flexible material can be configured to receive a front portion of eyeglasses of any shape. In such an aspect, the shape and the flexibility of the inner frame of the flexible material are such that the eyeglass accessory can receive a front portion of eyeglasses of any shape. For example, the shape and the flexibility of the inner frame of the flexible material can be such that the eyeglass accessory can receive a front portion of eyeglasses being circular, oval, rectangular, heart, diamond, cat eyes, aviator, butterfly, or wayfarer. Accordingly, the inner frame of the flexible material can be configured to be used with any eyeglasses.

In one aspect, the flexible eyeglass housing can be a flexible and elastic material. Suitable materials for the flexible eyeglass housing include, but are not limited to, rubber, silicone, or plastic, or a combination thereof.

In one aspect, the inner frame of the flexible material can be a flexible and elastic material. Suitable materials for the inner frame of the flexible material include, but are not limited to, rubber, such as, for example, synthetic rubber or natural rubber; silicone; or plastic, such as, for example, polyvinyl chloride (PVC), polycarbonates, or acrylics; or a combination thereof.

Figure 5:
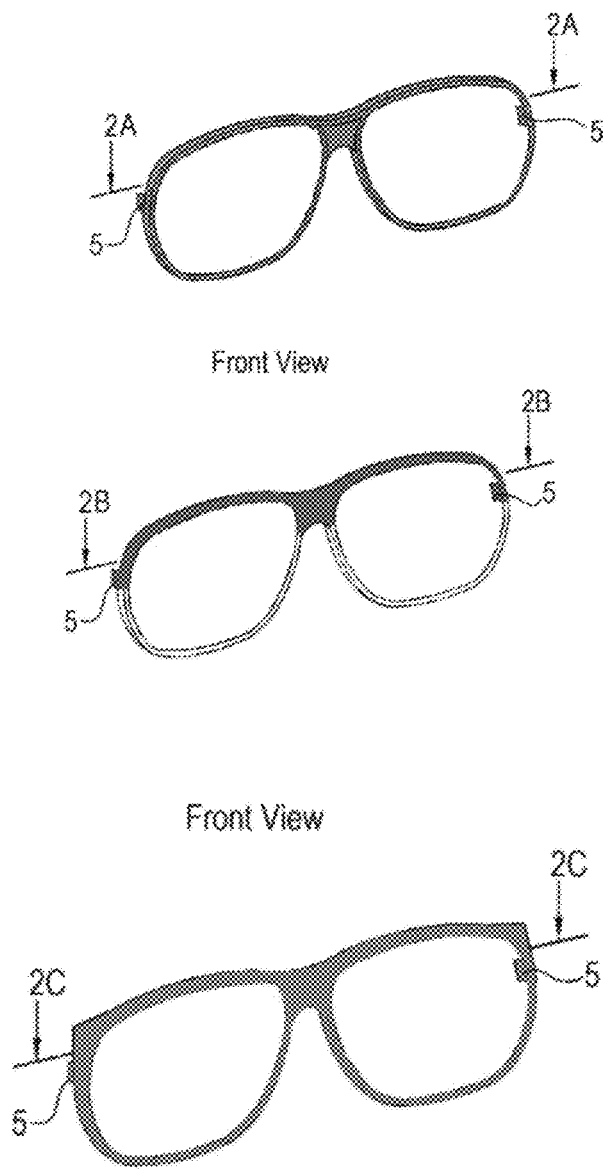
FIG. 5 shows examples of the eyeglass accessory disclosed herein with different styles.

In one aspect, the flexible eyeglass housing can have any color and/or transparency. For example, the eyeglass frame can have multiple colors, see FIG. 5. In another example, the eyeglass frame can be transparent.

In one aspect, the inner frame of flexible material can have any color and/or transparency. For example, the inner frame of flexible material can have multiple colors, see FIG. 5. In another example, the inner frame of flexible material can be transparent.

Figure 6:
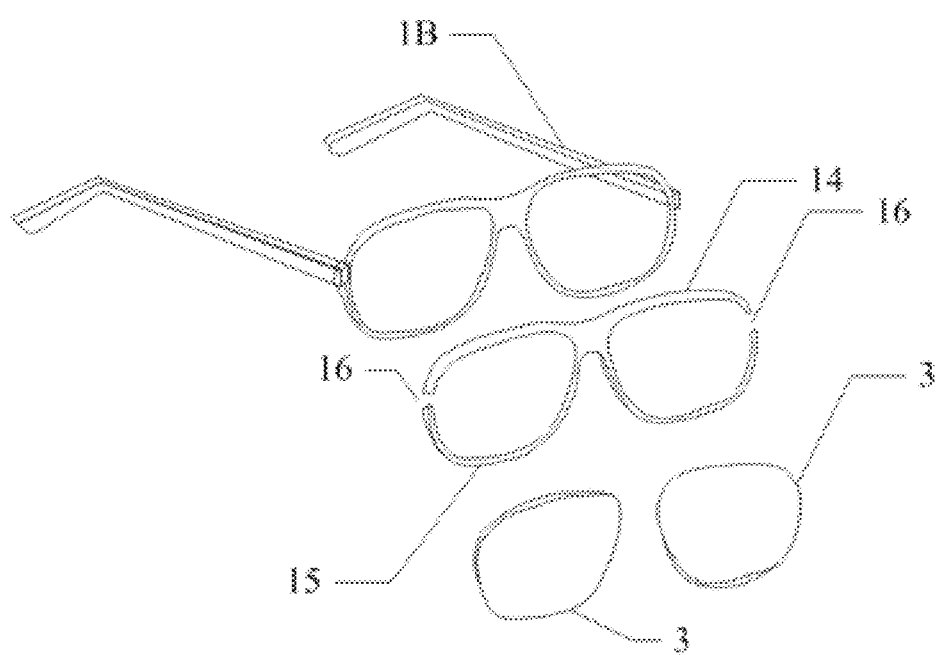
FIG. 6 shows an example of the eyeglass accessory disclosed herein.

Eyeglasses generally comprise temples, see component 1B in FIG. 1A. The inner frame of flexible material can be configured to fit around the temple, thereby making it easier to secure the eyeglass accessory to the front portion of the eyeglasses. Accordingly, in one aspect, the inner frame of the flexible material comprises a first frame of a flexible material and a second frame of a flexible material, wherein the first frame and second frame are spaced apart to define a void configured to fit a temple of the eyeglasses. The void between the first frame and second frame is large enough to fit a temple, thereby avoiding the temple interfering with the attachment of the eyeglass accessory to the eyeglasses. The size of the void can vary depending on the size of the temple. An example of such a configuration is shown in FIG. 6. In FIG. 6, the first frame 14 and the second frame 15 are spaced apart to define void 16. Void 16 has a size to fit temple 1B. As such, the eyeglass accessory can be secured to the eyeglasses without interference of the temple 1B.

In another aspect, the eyeglass accessory can further comprises a front end piece 5, which is configured to receive a butt strap 1C on the eyeglasses 1, see FIG. 1A.

As described above, exemplary configurations of the inner frame are shown in FIGS. 1A-1E and 6. The front portion of the eyeglasses can be received by the eyeglass accessory, as follows: 1) bend open the flexible material of the inner frame to allow the eyeglasses to be inserted within the continuous groove of the inner frame; 2) insert the eyeglasses within the continuous groove of the inner frame; and 3) allow the inner frame to restore to its original shape and size, thereby securing the eyeglasses within the continuous groove of the inner frame. In its original size a boarder of the inner frame of flexible material is smaller in size than the front portion of the eyeglasses, thereby securing the eyeglasses within the continuous groove of the inner frame. In its original size a boarder of the inner frame of flexible material also prevents eyeglasses form being inserted within the inner frame, without bending open the flexible material of the inner frame. The eyeglasses can be removed, also referred to herein as detached, from eyeglass accessory, as follows: 1) bend open the flexible material of the inner frame to allow the eyeglasses to be removed from the continuous groove of the inner frame; 2) remove the eyeglasses from the continuous groove of the inner frame; and 3) allow the inner frame to restore to its original shape.

In another aspect, the eyeglass accessory further comprises a bridge piece 4, 7 and a nose pad 9, see FIG. 1A. In another aspect, the eyeglass accessory does not comprise a nose pad.

Also disclosed herein is a method for covering eyeglasses or eyeglass lenses. The method comprises the step of securing an eyeglass accessory disclosed herein to eyeglasses, thereby covering the eyeglasses with the eyeglass accessory. Also disclosed herein is an attachable/detachable sun-shade frame assembly adaptable for holding replaceable sunglass lenses or optical lenses of different curvatures, comprising an inner frame and an sun-shade/transitional glasses frame; the sun-shade frame covers the front and back inner frame with an back groove lines that suitably stretch and shaped to fit the front and back preinstalled frame to be installed thereon; with variable curvature to fit and replace sunglass lenses or optical lenses installed thereon, with the inner frame having a rear periphery and abutting eyeglass lens, comprising: a transparent optical material comprising temporary sun-shade suitably shaped to cover the prescription eyeglass lens; and adhering means for coupling the temporary sun-shade transparent optical material to the prescription eyeglass lens. The sun-shade frame elastic and or soft rubber-like materials adhering means comprising an inherent viscosity to the inner frame. The soft cover rubble like material will help protect the original frame from damage or breakage.

In one aspect, the sun-shade lenses can be displayed with or replace with HD sun-shade lenses and various type of colors lenses, the replaceable optical lenses or the sun-shade lenses are assembled stably or disassembled through a fast and convenient operation from attachable/detachable sun-shade frame.

In one aspect, the back of the attachable/detachable frame has an back groove/crease to slip the preinstalled frame into, which takes the unique form of the preinstalled frame that can be displayed in various colors changing the color of the original frame.

The attachable/detachable sun-shade front frame can be displayed in different styles of designs with various colors, the sun-shade frame covers the front and back inner frame with the back of the sun-shade frame having an back groove line that suitably stretch and shaped to fit the front and back preinstalled frame to be installed thereon: by stretching the soft like rubber to fit the front and back of the preinstalled frame having a variable curvature to fit and replace prescription or transparent optical eyeglass frame; through a fast and convenient operation from attachable/detachable sun-shade frame.

Figure 3:
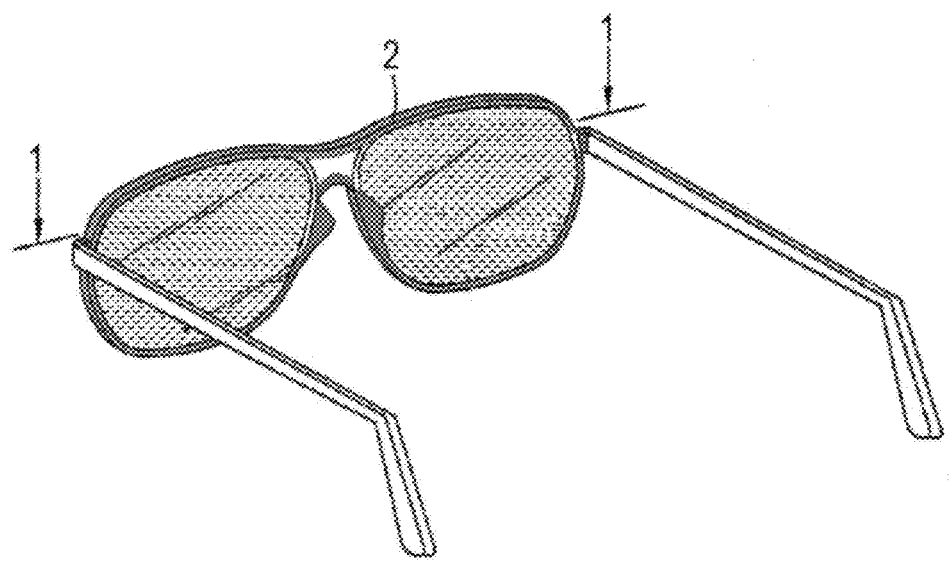
FIG. 3 shows an example of the eyeglass accessory disclosed herein when assembled with a front portion of eyeglasses.

According to the first embodiment of the present invention, an eyeglass frame assembly adaptable to lenses of different curvatures (as shown in dwgs. 1 and 2 in FIG. 1A) allows optical lenses (dwg. 2 in FIG. 1A) or sunshade lenses (3 in dwg. 2) to be attached or detached to an eyeglass frame [dwg. 1 showing the eyeglass frame with the optical lenses and (dwg. 2 in FIG. 1A) showing the eyeglass frame with the sunshade lenses] which comprised an inner frame (1 in FIG. 1A) and the eyeglass frame (FIG. 3).

The outer frame (2 in FIG. 1A) will be design to fit variable curvature that will be capable to fit different types of preinstalled frames (dwg. 1 in FIG. 1A) or sunshade lenses (FIG. 3) installed thereon, thereby providing the sunshade lenses of desired functions. [e. g. in FIG. 1A being installed with the optical lenses (dwg. 2 in FIG. 1A), and in (FIG. 3) being installed with the sunglass lenses]. The outer frame (dwg. 2 in FIG. 1A) has its rear periphery formed as an abutting surface that covers the preinstalled eyeglass frame (dwg. 1 in FIG. 1A), (dwg. 2 in FIG. 1A) elastic and or soft rubber-like material frame which covers and takes the form of a uniquely shape to fit variable types of preinstalled frames.

Figure 2:
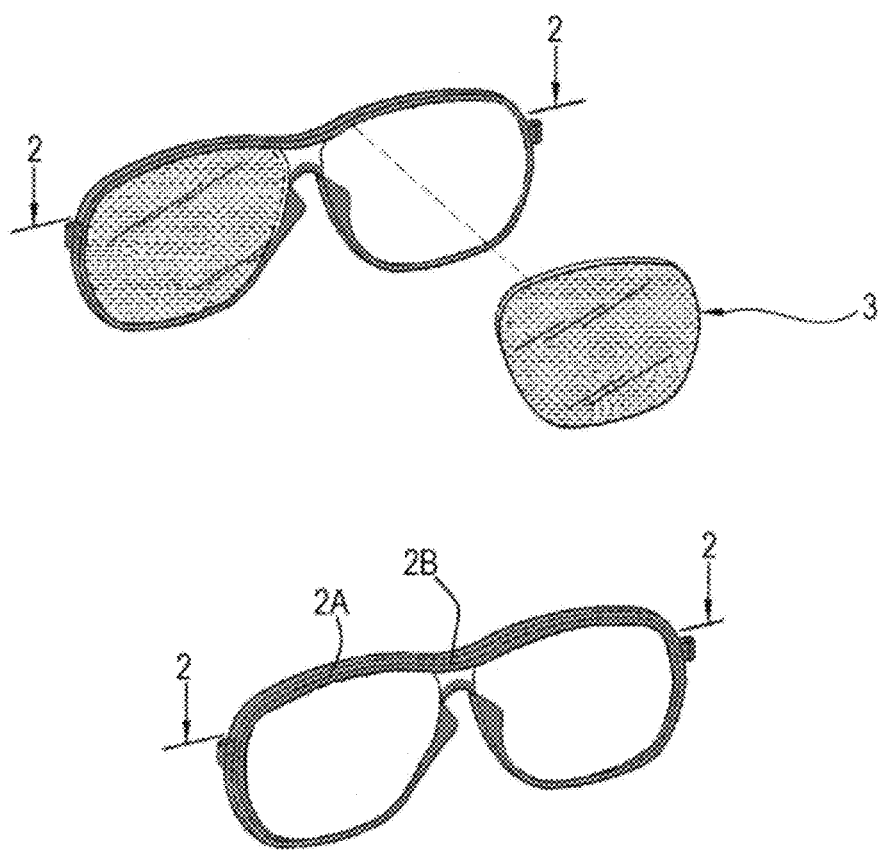
FIG. 2 shows an example of the eyeglass accessory disclosed herein.
Figure 4:
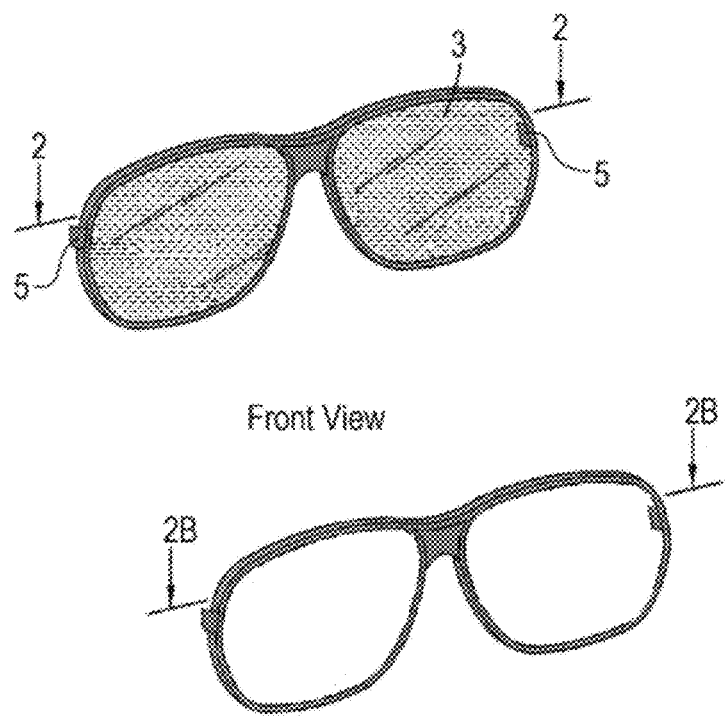
FIG. 4 shows a front view of an example of the eyeglass accessory disclosed herein.

The eyeglass frame (dwg. 2 in FIG. 1A) is a frame body with elastic and or soft rubber-like materials configured to be assembled with the inner frame (dwg. 1 in FIG. 1A) preinstalled with the optical or prescription eyeglass frame or frames (3 in dwg. 2) or sunshade lenses (FIG. 3). (Dwg. 2 in FIG. 1A, FIG. 2, FIG. 4 and FIG. 5) eyeglass frame has its front and back view formed as a receiving area which cover the entire preinstalled frames (2A, 2B in FIG. 2) with its elastic and or soft rubber-like materials, (5 in FIGS. 1A, 4 and 5) the front end piece is cover with elastic and or soft rubber-like materials which cover and meets (11, 12 of dwg. 2 in FIG. 1A) the inside and backside of the end piece connected to (1C in FIG. 1A) the butt-strap which connect to (1B in FIG. 1A) the temple of the frame. The outer frame (dwg. 2 in FIG. 1A, (4) covers the bar and top bridge (7) bottom backside of bridge and (9) the nose pad which help support the outer frame), (2A in FIG. 2) shows the sunshade back lenses groove and (2B in FIG. 2) shows the sunshade frame back groove. (Dwg. 2 in FIG. 1A), (3 in FIG. 2), (3 in FIG. 4) shows the sunglass lenses can be attached or detached with different shades of colors sunglass lenses. (2A, 2B and 2C in FIG. 5) is the outer elastic and or soft rubber-like materials frame that can be displayed in different colors. (FIG. 5) also shows the elastic and or soft rubber-like materials front frame can have a different design from the original preinstalled frames which unique designed to fit (dwg. 1 in FIG. 1A).

The invention claimed is:

1. An eyeglass accessory comprising:
   a) one or more eyeglass lenses; and
   b) a flexible eyeglass housing comprising an outer frame comprising one or more continuous grooves retaining the one or more eyeglass lenses, wherein the flexible eyeglass housing further comprises an inner frame of a flexible material that comprises a continuous groove configured to receive a front portion of eyeglasses, wherein the inner frame of the flexible material comprises a first frame of a flexible material and a second frame of the flexible material, wherein the first frame and the second frame are spaced apart to define a void configured to fit a temple of the eyeglasses.

2. The eyeglass accessory of claim 1, wherein the outer frame comprises two continuous grooves.

3. The eyeglass accessory of claim 1, wherein the outer frame comprises one continuous groove.

4. The eyeglass accessory of claim 1, wherein the one or more eyeglass lenses are shaded.

5. The eyeglass accessory of claim 1, wherein the inner frame of the flexible material is transparent.

6. The eyeglass accessory of claim 1, wherein the inner frame of the flexible material comprises rubber, silicone, or plastic, or a combination thereof.

7. The eyeglass accessory of claim 1, wherein the inner frame of the flexible material is configured to secure eyeglasses of any shape.

8. The eyeglass accessory of claim 1, wherein the flexible material of the first frame and the second frame are different.

9. The eyeglass accessory of claim 1, wherein the one or more eyeglass lenses are one or more polarized eyeglass lenses.

10. The eyeglass accessory of claim 1, wherein the shape of the one or more eyeglass lenses are circular, oval, rectangular, heart, diamond, cat eye, aviator, butterfly, or wayfarer, and wherein the inner frame of the flexible material has a substantial identical shape as the one or more eyeglass lenses.

11. The eyeglass accessory of claim 1, wherein the shape of the one or more eyeglass lenses are circular, oval, rectangular, heart, diamond, cat eyes, aviator, butterfly, or wayfarer, and wherein the inner frame of the flexible material has shape that is different than the one or more eyeglass lenses.

12. The eyeglass accessory of claim 1, wherein the one or more eyeglass lenses are one or more 3D eyeglass lenses.

13. The eyeglass accessory of claim 1, wherein the eyeglass accessory is for single use.

14. The eyeglass accessory of claim 1, wherein the eyeglass accessory is sterile.

15. The eyeglass accessory of claim 1, wherein an outer edge of the one or more eyeglass lenses extend at least 2 cm from an outer edge of the inner frame of the flexible material.

16. The eyeglass accessory of claim 1, wherein an outer edge of the one or more eyeglass lenses extend at least 10 cm from an outer edge of the inner frame of the flexible material.

17. An eyeglass accessory comprising:
   a) one or more eyeglass lenses; and
   b) a flexible eyeglass housing comprising an outer surface retaining the one or more eyeglass lenses, wherein the flexible eyeglass housing further comprises an inner frame of a flexible material that comprises a continuous groove configured to receive a front portion of eyeglasses,
      wherein the inner frame of the flexible material comprises a first frame of a flexible material and a second frame of the flexible material, wherein the first frame and the second frame are spaced apart to define a void configured to fit a temple of the eyeglasses.

18. The eyeglass accessory of claim 17, wherein the outer surface retains the one or more eyeglass lenses via an adhesive.

* * * * *